United States Patent [11] 3,602,484

[72] Inventor Pierre Poncet
 54, Rue du Professeur Florence, Lyon, France
[21] Appl. No. 784,781
[22] Filed Dec. 18, 1968
[45] Patented Aug. 31, 1971
[32] Priority Dec. 28, 1967
[33] France
[31] 49,474

[54] MIXERS
 5 Claims, 7 Drawing Figs.
[52] U.S. Cl. ...................................................... 259/6, 259/21, 198/213
[51] Int. Cl. ...................................................... B01f 7/02
[50] Field of Search .......................................... 259/6, 9, 21, 25, 64, 104; 100/145, 147; 198/213, 214, 217

[56] References Cited
UNITED STATES PATENTS
| | | | |
|---|---|---|---|
| 319,809 | 6/1885 | Gathman .................... | 198/213 X |
| 918,494 | 4/1909 | Barr ........................... | 259/104 |
| 1,989,751 | 2/1935 | Hagler et al. ................ | 198/213 X |
| 2,657,831 | 11/1953 | Pierce ........................ | 222/412 X |
| 3,176,966 | 4/1965 | Rietz et al. .................. | 259/6 X |

FOREIGN PATENTS
| | | | |
|---|---|---|---|
| 122,422 | 11/1927 | Switzerland ................. | 100/147 |
| 838,443 | 5/1952 | Germany ..................... | 259/6 |

*Primary Examiner*—Mervin Stein
*Attorney*—Alexander & Dowell

ABSTRACT: The materials to be mixed are propelled along a first or inlet path which communicates through a plurality of transverse passages with a second or outlet path parallel to the first one and along which they are propelled in the reverse direction. The propelling means may be in the form of screws rotating in bores or gutters. These screws have preferably a frustoconical core in order that the flow of material which they determine decreases in the first path in the direction of travel of the materials and on the contrary increases in the second path. In the case of screws rotating in gutters, the latter may be separated by a relatively low position over which the materials flow regularly from the first or inlet gutter into the second or outlet one.

INVENTOR
Pierre Poncet
BY
Alexander H Lowell
attorneys

MIXERS

The present invention refers to mixers for liquid, pasty, pulverulent or fibrous materials.

The known mixers are generally satisfactory when dealing with materials having similar physical properties. For instance they operate under relatively good conditions when it is desired to mix together a number of viscous substances. But considerable difficulties are encountered for mixing a fibrous material with a paste or with a powder.

It is the object of this invention to provide a mixer by means of which it may be easy to obtain a quite homogenous mixture of materials having very different physical properties, as for instance loose fibers and a pulverulent or viscous synthetic resin.

The mixer according to the present invention comprises an inlet and an outlet canal, substantially parallel to each other, through which the materials being treated are propelled respectively in one and the other direction, the said canals communicating with each other by a number of substantially transverse passages provided along at least a portion of the length of the said canals.

The material propelling means provided in each canal may conveniently be in the form of a rotating screw. These screws and the corresponding canals are preferably so arranged that in the inlet canal the flow of materials through a transverse plane decreases along the length of the canal in the direction of travel of the materials and that in the outlet canal it increases.

In the accompanying drawings:

FIG. 1 is a very diagrammatical illustration of the operation of a mixer according to this invention.

FIG. 2 diagrammatically shows a possible construction of such a mixer.

Figure 7:
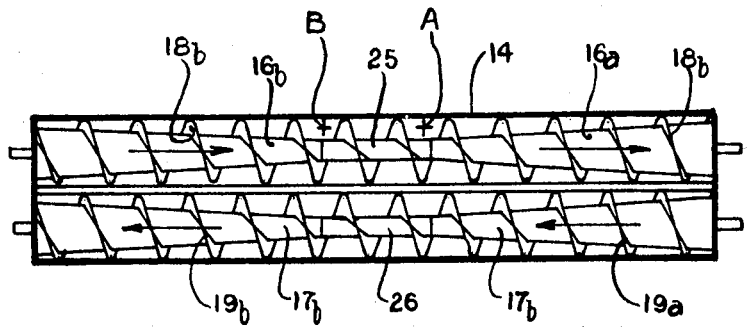

FIG. 7 very diagrammatically illustrates a compound apparatus.

Figure 1:
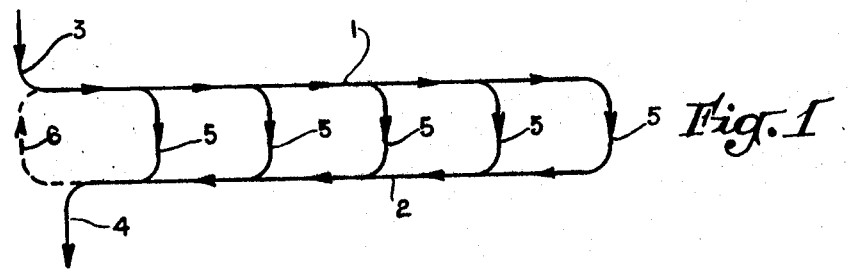

In the quite diagrammatical illustration of FIG. 1, the line referenced 1 designates a first or inlet canal provided with appropriate propelling means which propel the materials to be treated towards the right. The mixer comprises a second or outlet canal 2 parallel to the inlet canal and also equipped with propelling means but which displace the materials towards the left. The materials to be mixed are introduced at 3 into the left end of the inlet canal in the form of a rough or heterogeneous mixture or of small separate fractions, and the homogeneous mixture realized by the mixer issues therefrom at the left end of the outlet canal 2, as shown at 4. Canals 1 and 2 are connected with each other by a number of transverse passages 5, the apparatus being so arranged that the flow of material is substantially the same through all these passages.

As indicated in dashed line at 6 a fraction of the mixture issuing from the outlet canal may be recycled into the inlet canal 1.

For a better understanding of the operation of the mixer one may consider a quite heterogeneous mass M of a number of materials to be thoroughly mixed together. This mass may be divided into a number of successive heterogeneous elementary masses m, m', m''. Each elementary mass is thus itself formed of a quite rough mixture of the materials to be mixed and owing to the heterogeneous character of the single mass M, the respective proportions of the materials to be mixed are widely different in the elementary masses m, m', m''. If these elementary masses are reunited at random, they form another single mass M1 which is obviously less heterogeneous that the initial single mass M since the probability of the presence of volumes having a composition quite different from the average composition of the whole mass is substantially reduced.

If now the same operation is repeated with the second single mass M1, there is obtained a more homogeneous mass M2, and so on. After a sufficient number of operations the mass finally obtained may have any desired degree of homogeneity.

The mixer of FIG. 1 effects automatically the above mentioned operations. A rough heterogeneous mixture M introduced at 3 into the inlet canal 1 is divided by the transverse passages 5 into five portions or elementary masses which are recombined in the outlet canal 2 at random or more exactly in conditions wholly different from those in which they had been divided from the initial mass M. The product which issues at 4 therefore corresponds to the single mass M1. If this product or mass is recycled into canal 1, there will be obtained the second single mass M2, and so on.

In continuous operation the product or mixture issuing from the outlet canal 2 is only partly recycled. The recycled portion mixes with the rough mixture introduced into the mixer and already reduces the heterogeneity thereof. The general operation is thus improved.

Figure 2:
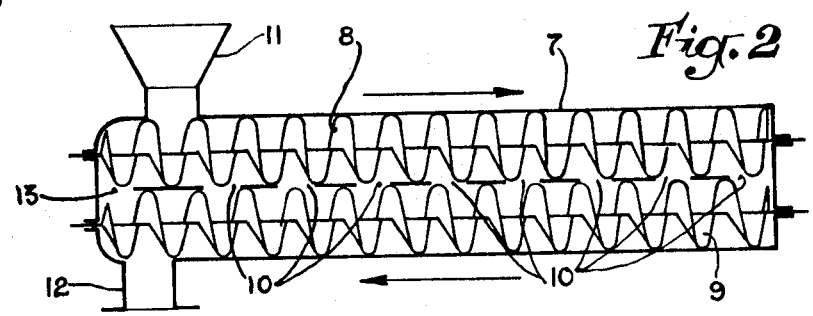

In the mixer 7 diagrammatically illustrated in FIG. 2 the material propelling means are in the form of screws 8 and 9 rotating within two superposed horizontal cylinders which form the inlet and outlet canals 1 and 2 of FIG. 1. These cylinders communicate with each other by appropriately dimensioned orifices 10. The materials to be mixed are fed through a hopper 11 into the upper cylinder and the mixed product issues through a lower opening 12 from the lower one. An aperture 13 permits of recycling a fraction of this product into the upper cylinder. Screw 9 would of course be so arranged and/or driven at such a speed that it may receives and propel towards opening 12 and/or aperture 13 the whole quantity of materials propelled by screw 8 from the hopper 11 and/or aperture 13.

In practical operation it is somewhat difficult to obtain a uniform flow of materials through all the orifices or transverse passages 10. But this difficulty may be overcome by so arranging screws 8 and 9 that the flow which they realize through a transverse plane decreases progressively in the direction of travel of the materials in the case of the screw corresponding to the inlet canal (screw 8) and on the contrary increases progressively in this same direction in the case of the screw corresponding to the outlet canal (screw 9). This may be obtained by varying either the pitch of the screws, or their effective cross section, or both.

Figure 3:
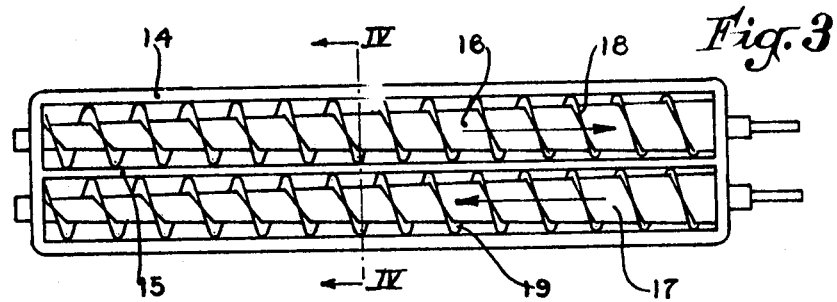
FIG. 3 is a plan view of another embodiment, more particularly for pulverulent or fibrous materials.
Figure 4:
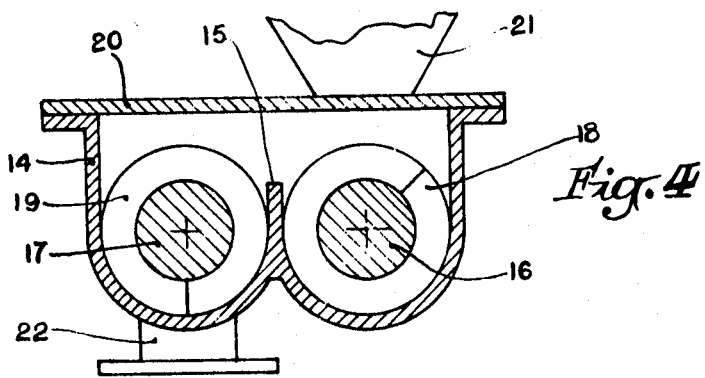
FIG. 4 is an enlarged cross section taken along line IV—IV of FIG. 3.
Figure 5:
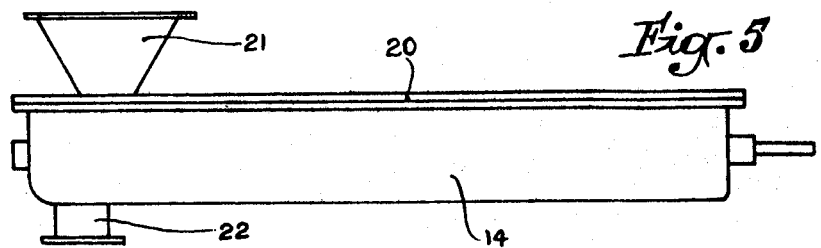
FIG. 5 is a side view of the apparatus of FIGS. 3 and 4.

The mixer of FIGS. 3 to 5 comprises an elongated trough 14 formed of two parallel substantially semicylindrical gutters separated from each other by an intermediate partition 15 which terminates at a lower level them the lateral sides of the trough. On each gutter is mounted a rotating screw, each having a frustoconical core, respectively 16, 17, supporting a helical blade, respectively 18, 19 of uniform pitch and with a uniform outer diameter substantially equal to the diameter of the gutters. The smaller bases of the frustoconical cores are disposed adjacent the same end of the trough. The latter is closed by a cover 20 which supports an inlet hopper 21 discharging on the end of screw 16–18 which corresponds to the smaller base of the core 16 thereof. The trough has a lower outlet 22 below the adjacent end of screw 17–19.

The materials to be mixed are loaded into hopper 21. They are propelled towards the right in FIG. 3 by screw 16–18, as indicated by the arrow. Owing to the increasing diameter of core 16, these materials overflow the upper edge of partition 15, and they are taken by screw 17–19 and propelled towards outlet 22. The transverse flow of materials from screw 16–18 into screw 17–19 extends uniformly along substantially the whole length of partition 15.

When it desired to recycle a portion of the mixed product from screw 17–19 into screw 16–18 at the left end of the mixer in FIG. 3 it is sufficient to throttle the outlet 22, as for instance by means of a slide valve. The product accumulates at the left end of screw 17-19 and it overflows partition 15 so as to be reintroduced into screw 16-18.

It is obvious that the same results could be obtained with screws having a core of constant diameter, but a pitch decreasing from left to right in FIG. 3, or with screws having a decreasing outer diameter, the corresponding gutters being correspondingly shaped.

The mixer of FIGS. 3 to 5 is particularly adapted for freely flowing granular or fibrous materials or even for liquids. It is not suitable for pasty, tacky or viscous substances.

Figure 6:
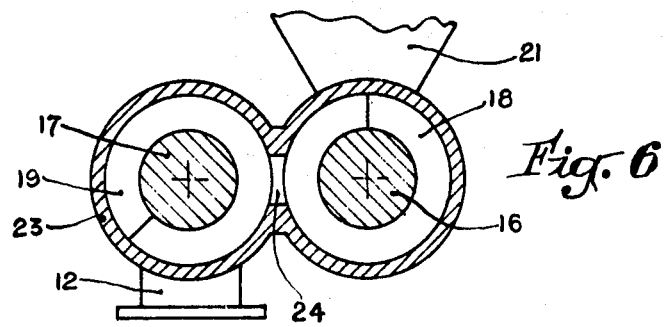
FIG. 6 is a cross section similar to that of FIG. 3, but corresponding to a mixer more particularly for viscous materials.

FIG. 6 illustrates an embodiment which differs from the mixer of FIGS. 3 to 5 in that the gutters are replaced by cylindrical bores provided in a casing 23 which closely surrounds the screws 16-18 and 17-19, these bores communicating through transverse passages such as 24. Such an apparatus is particularly efficient with viscous materials which tend to adhere to the surfaces of the casing or of the screws. The inlet hopper 21 may be replaced by a preliminary mixer, such as a mere screw conveyor, which feeds the apparatus with a rough mixture of the materials to be treated.

FIG. 7 illustrates a compound apparatus which may be considered as formed of two elementary mixers of the kind of FIGS. 3 to 5 disposed in series. The first one comprises two parallel screws 162-18a and 17a-19a with frustoconical cores. The second one is formed of screws 16a-18b and 17b-19 also with frustoconical cores. Screws 16a-18a and 16b-18b are disposed in line, the smaller bases of their cores being rigidly connected with each other by a short cylindrical portion 25 also supporting a helical blade. In the same manner screws 16b-18b and 17b-19b are in line with the smaller bases of their cores assembled by a cylindrical portion 26. The respective positions of the inlet hopper and of the lower outlet have been very diagrammatically indicated at A and B.

The screws rotate in two parallel gutters separated by an intermediate partition 15, as in the case of FIG. 4.

The material loaded at A are submitted to a first mixing step by screws 16b-18a and 17a-19a, then to a second one by screws 16b-18b and 17b-19a, The mixed product issues at B and if the outlet is partly closed, a portion of this product is recycled from B to A.

It would of course be easy to imagine a large number of other arrangements of compound apparatus formed of any number of elementary mixers disposed in series.

I claim:
1. A mixer for materials to be mixed comprising:
 a. a first canal extending between a first end and a second end, with said first end forming an inlet to receive said materials;
 b. a first propelling screw of the variable flow type rotating in said first canal to propel said materials from said first end towards said second end with a progressively decreasing flow rate;
 c. a second canal substantially parallel to said first canal, said second canal extending between a first end and a second end in a direction opposed to said first canal, with said second end forming an outlet for said materials;
 d. a second propelling screw rotating in said second canal to propel said materials from the first end of said second canal to the second end thereof with a progressively increasing flow rate;
 e. and transverse passage means provided between said first and second canals along the whole length of said first and second screws;
 whereby the excess of materials resulting from the progressively decreasing flow rate in said first canal is positively introduced into said second canal in correspondence with the progressively increasing flow rate insured in said second canal.

2. In a mixer as claimed in claim 1, said first screw being of substantially uniform outer diameter and having a frustoconical core of progressively increasing diameter between the first end and the second end of said first canal.

3. In a mixer as claimed in claim 1, said second screw being of substantially uniform outer diameter and having a frustoconical core of progressively decreasing diameter between the first end and the second end of said second canal.

4. In a mixer as claimed in claim 1, said passage means comprising a single passage extending along the whole length of said first and second canals.

5. In a mixer as claimed in claim 1, means to recycle a portion of said materials from the second end of said second canal into the first end of said first canal.